3,274,310
METHOD OF MAKING A POROUS CERAMIC PRODUCT

Lou Kohl, Palatine, Ill., assignor, by mesne assignments, to The Celotex Corporation, Chicago, Ill., a corporation of Delaware
No Drawing. Filed Mar. 19, 1964, Ser. No. 353,261
6 Claims. (Cl. 264—43)

This invention relates to a porous ceramic product, and more particularly to an improved method for making a porous ceramic product.

Ceramic products have the characteristics of dimenional stability and incombustibility even when subjected to extremely high temperatures. These characteristics are particularly advantageous when such a product is used as a building material because the product enhances the fire resistance of the structure. When the ceramic product also exhibits the characteristics of sound absorption, it becomes even more valuable as a building product. A porous ceramic product has these qualities.

For these reasons, a porous ceramic product can have wide application and is far more desirable than other types of building materials. In addition, when the porous ceramic product is formed into acoustical tiles or panels, its characteristics of dimensional stability, excellent sound absorption and incombustibility are ideal for use as a building material.

In the conventional wet forming method of making a ceramic product, the moist clay and aggregate mass is first dried so that its moisture content is around 5% by weight, or even less. The general belief is that unless the moist mass is dried before firing, the escaping water vapor will form cracks in the fired product and render it useless. However, in general, this drying step requires time to complete and usually an oven separate from the firing kiln. In some instances the firing kiln has an entrance chamber in which the temperature is maintained at a very much lower temperature than that in the firing portion of the kiln to drive out excess moisture from the ceramic product prior to firing.

It is recognized that in the dry pressing or dust pressing techniques, such as are used to produce conventional ceramic wall tile, ceramic electrical insulators, etc., the separate dry operation is also reduced or eliminated at great production cost savings. However, the dry firing techniques are not suited to producing ceramic products designed to have the desirable properties of good sound absorption and thermal insulation.

In the present product, the expanded mineral aggregate would be crushed and rendered useless under the extreme pressures used in the dry pressing technique.

To be more specific, the prior art teaches the drying of the moist ceramic mass at a temperature of between 220° F. or less and 240° F. for a period of between about 2 and about 6 hours in a tunnel or batch dryer. In certain instances, following the drying step, the dried ceramic mass is fired at temperatures of between 1300° F. to 1880° F. However, the firing time varied from 12 hours at 1300° F. to 2 hours at 1880° F.

Even in those cases where the firing of the moist ceramic mass may be done without a previous long drying period, the time of firing is usually in the order of more than 2 hours. In fact, the prior art speaks of "soaking" the ceramic product in a firing temperature, thus implying a long time in the firing kiln.

It has been unexpectedly found that a porous ceramic mass may be fired at high temperatures for as short a period as 15 to 20 minutes and yet not crack or disintegrate. Such a process will speed up the production of porous ceramic products with a great savings in time, money and fuel. The cost per unit will rapidly diminish as the amount of product increases. In addition, since the length of time the product must remain in the firing kiln is radically reduced, the length or volume of the kiln and, thus, the amount of material necessary to make the kiln, can be vastly reduced.

It is an object of the present invention to provide a novel method of making a ceramic product which eliminates the separate drying step.

It is another object of the present invention to provide a novel method of making a ceramic product which is faster and more economical than conventional methods.

It is yet another object of the present invention to provide a new and novel method of making a ceramic product which simplifies some of the equipment used in prior methods.

In summary, the present novel method eliminates the usual step of drying the ceramic product before firing to speed up its manufacture and reduce its cost of manufacture by eliminating a drying oven. In addition, the extremely short time required in the kiln to fire the ceramic product reduces its cost of manufacture and greatly increases the amount of product which can be made in a given time period.

In accordance with this invention, a ceramic acoustical tile is produced from an expanded mineral aggregate in particulate form bonded together by a thin fired clay coating on the particles which does not fill the voids in the tile so that the voids run interconnectedly throughout the tile. The tile may have glaze finish which however does not seal the voids. The tile as made in accordance with the present invention gives that balance of properties essential to maximum performance and life.

The mineral aggregate employed is in expanded form and is well exemplified by perlite which will be used to illustrate the invention. Some of the materials which may be substituted in whole or in part for the perlite are vermiculite, expanded clay materials, mineral wool, glass wool, artificially expanded glass particles, ceramic materials with densities in the range produced by burnout techniques, and foamed materials such as foamed glass. The term "expanded" is used here to cover not only expanded perlite and related materials, but also the "wool" type substances as illustrated above, or other lightweight aggregate produced by various techniques as in burnout operations, foaming, etc. Perlite is used herein to illustrate a prepared aggregate.

The kind and size of particle of the aggregate plays an important part in the production of the tile and its properties. The rock type material such as perlite may be treated to produce the desired particle size, by conventional methods. Thus the rock may be crushed to fine particle size and heated at conventional temperatures to obtain the desired expansion. At this stage, the granular expanded material will usually consist of grains of varied sizes. The average sized particles may be separated from the fine and coarser material to obtain a more uniform product preferable for acoustic tile use. Again referring to perlite as illustrative, preferred densities may be about 4 to 12 lbs./cu. ft. and particle size of from —8 to 20 or 30 mesh. The aggregate such as perlite, to give the desired balance of physical properties desired, depends upon surface area and particle distribution of the aggregate.

The expanded aggregate particles illustrated above, are bonded together to give a porous structure as a result of the intercommunicating channels formed in the bonded structure without filling the voids therein, which channels permit access from the interior to the exterior of the tile or other formed structure to permit sound to be absorbed.

The selection of the bonding agent is very important since it must have such qualities as a resistance to deterioration when exposed to moisture or to fire.

In accordance with the present invention, a thin clay slip is utilized to bond the particles of aggregate, such as perlite, to give properties important in controlling the ultimate desired characteristics in the finished acoustic product. The clay slip must be of sufficient volume and desirably thin enough to coat each individual particle with a coating on the order of 50 to $300 \times 10^{-7}$ cm. With reference to the viscosity of the slip, a range of from 750 to 3000 centipoises would be deemed adequate. In general, the viscosity is determined by the amount of deflocculant added. However, the viscosity to some extent is determined by the skill of the person formulating the slip and within limits it is an art. The slip should be of composition and volume to contain enough clay substance to produce adequate bonding strength with minimum filling of pore spaces. This requires controlled viscosity, but the slip must also have a viscosity low enough to permit adequate mixing. Consequently, a bond is employed which is a combination of a bentonite type clay with a kaolinite clay. For this reason a strong bond clay, such as hector, may be used as one of the bond slip ingredients. Other bentonites containing montmorillonite, hectorite, eyrite, illite, or various mixtures of any of these and other plastic materials may be substituted for the hector. The viscosity considerations limit the quantities of bentonite which may be used, since bentonite will act with water to form a viscous element. The balance of the clay materials are supplied as kaolinite type clay. Kaolin, ball clays, native clays, fire clays or bond clays may be used individually or in combination to complete the bond slip. Any of the common ceramic slip ingredients may be included as long as the required dry bonding is achieved and the pore spaces are not filled.

Deflocculants may be used to control viscosity, such deflocculants including, for example, "Calgon" (sodium hexametaphosphate) and sodium carbonate, and other deflocculants commonly used in this art.

As exemplary of overall proportions desirably employed in producing acoustic tile in accordance with the present invention, the following is given:

TABLE I

| Material | Volume/ cu. in. | Percent by Volume |
|---|---|---|
| Kaolinite type clay (based on average) | 2–8 | ½–4 |
| Bentonite type clay (clay density) | 1–4 | ¼–2 |
| Perlite (density 4–15/cu. ft. size—min. 85%+30 mesh) | 235–370 | 94–99¾ |
| Water (percent of dry volume) | 36–61 | 9–26 |

The following example illustrates a specific mix to give an acoustical tile.

*Example I*

Material: Percent by volume
    Kaolex (plastic kaolin) _____ 2
    Hector (hectorite type bentonite) _____ 1
    Perlite (specific gravity .08 size −4 to +30 mesh) _____ 97
    Total solids _____ 100
    Water (percent of dry materials) _____ 16
    "Calgon" (deflocculant) _____ —

The bond slip may be mixed in any common way to produce maximum dispersion of particles and uniformity of composition. The mixing of the bond material is designed to coat the aggregate with the bond material without substantially reducing the aggregate size. Since the aggregates noted are extremely friable, the reduction of aggregate size will produce fine material which may fill the pore space. Therefore, mixing equipment is used which will do this job while limiting the time and intensity below that which would be considered normal intimate mixing in a standard ceramic product. An example of proper mixing would be a Muller Company plaster mixer. In this particular instance mixing time is limited to three minutes. The exact time of mixing will vary for different types of mixers, but in all cases must not be continued long enough to cause significant reduction in aggregate volume. For instance, with a ribbon type mixer, the mixing time should preferably be limited to less than two minutes.

The most composition or mass is then pressed into shape to establish the thickness of the porous ceramic products. If desired, individual molds may be prepared of suitable size for ultimate use. Alternatively, the moist composition may be formed on a conveyor belt in a continuous manner. At this time, however, the moist composition contains about 9 to 26% of water by volume of the dry ingredients. The moist composition has enough strength in this moist state to be carefully handled without disintegration.

Instead of the conventional drying step, which may take as much as three or four hours at a temperature of about 300° F., the moist formed mass is put directly into the firing kiln. The temperature in the kiln may be in the range of between 1450° and 1800° F. It has been found that the optimum temperature range at the surface of the product being fired is between 1550° F. and 1625° F. For the composition of aggregate and clay slip discussed, the following table sets forth the firing time and temperature for material of 1" in thickness.

TABLE II

| Firing time in minutes: | Average kiln temperature degree Fahrenheit |
|---|---|
| 20 | 1650 |
| 30 | 1600 |
| 60 | 1550 |

For thinner products, the firing time in the kiln can be shorter for the same temperature. For example, for a product ¾" in thickness, the time in the kiln may be reduced by about 20% to 30%. Again, for thinner products, such as ½" thick, the firing time at 1625° F. will be about 8 minutes.

For the most economical and shortest firing time, the temperature at the board surface should be about 1600° F. It has been found that at temperatures above 1700° F. the ceramic product deteriorates to where it becomes unsatisfactory because of excessive softening of the aggregate.

The kiln may be designed so that there is a heating zone ahead of the main firing zone. However, in accordance with the teachings of the invention, the temperature in the heating zone should be near to those in the firing zone. It should be realized that even if the temperature in the heating zone is slightly below that of the firing zone, it will still be far in excess of the more conventional drying temperatures heretofore known.

After the firing stage, the porous ceramic product should be cooled very rapidly in the air. Preferably, the porous ceramic product should be cooled to room temperature from its firing temperature in as short a time as 10 minutes. Air blowers may be directed against the fired ceramic product as soon as it is removed from the kiln to reduce the temperature from its fired temperature to ambient temperature in 10 minutes, or even less.

In summary, the present invention provides a novel method of making a porous ceramic product in which the product is fired in an extremely short time so that its manufacture can be accelerated greatly, resulting in economies in operating costs and in equipment.

While there has been set forth a specific embodiment of the present invention, changes and modifications may occur to those skilled in the art, and it is intended to cover such changes and modifications in the appended claims.

I claim:

1. The method of making a porous ceramic product comprising the steps of forming a shaped wet mass of expanded mineral aggregate in particulate form carrying a thin aqueous clay coating of between 50 and $300 \times 10^{-7}$ cm. in thickness on the particles, said mass having a water content of from about 9% to 26% by volume of the dry ingredients, placing said shaped wet mass into a furnace whose temperature is within the range of between 1450° F. and 1700° F., and maintaining said wet mass at a surface temperature within said range for a time period, the duration of said time period being from a minimum of 8 minutes at said temperature of 1700° F. to a maximum of 60 minutes at said temperature of 1450° F.

2. The method of making a porous ceramic product comprising the steps as set forth in claim 1, and cooling said mass to ambient room temperature in a period of less than 10 minutes.

3. The method of making a porous ceramic product comprising the steps as set forth in claim 1, and in which said surface temperature is within the range of 1550° F. and 1625° F.

4. The method of making a porous ceramic product comprising the steps as set forth in claim 3, and cooling said mass to ambient room temperature in a period of less than about 10 minutes.

5. The method of making a porous ceramic product comprising the steps of:

forming a shaped, wet mass of expanded mineral aggregate in particulate form carrying a thin aqueous clay coating on the particles, the clay including bentonite group and kaolinite group clays, the proportions by volume being from about 94% to 99.75% expanded mineral aggregate, 0.5% to 4% kaolinite group clay, 0.25% to 2% bentonite group clay, and from about 9% to 26% of water based on the dry volume of the composition; placing said shaped wet mass into a furnace whose temperature is within the range of between 1450° F. and 1700° F., and maintaining said wet mass at a surface temperature within said range for a time period, the duration of said time period being from a minimum of 8 minutes at said temperature of 1700° F. to a maximum of 60 minutes at said temperature of 1450° F.

6. The method of making a porous ceramic product comprising the steps as set forth in claim 5, and cooling said mass to ambient room temperature in a period of less than about 10 minutes.

References Cited by the Examiner
UNITED STATES PATENTS

| | | |
|---|---|---|
| 2,699,409 | 1/1955 | Hashimoto. |
| 2,702,748 | 2/1955 | Heine. |
| 2,987,411 | 6/1961 | Minnick _____ 264—43 X |
| 3,010,835 | 11/1961 | Charles et al. |

ROBERT F. WHITE, *Primary Examiner.*

J. A. FINLAYSON, *Assistant Examiner.*